March 31, 1931. T. DI PALMA 1,798,524
WINDSHIELD
Filed June 26, 1929
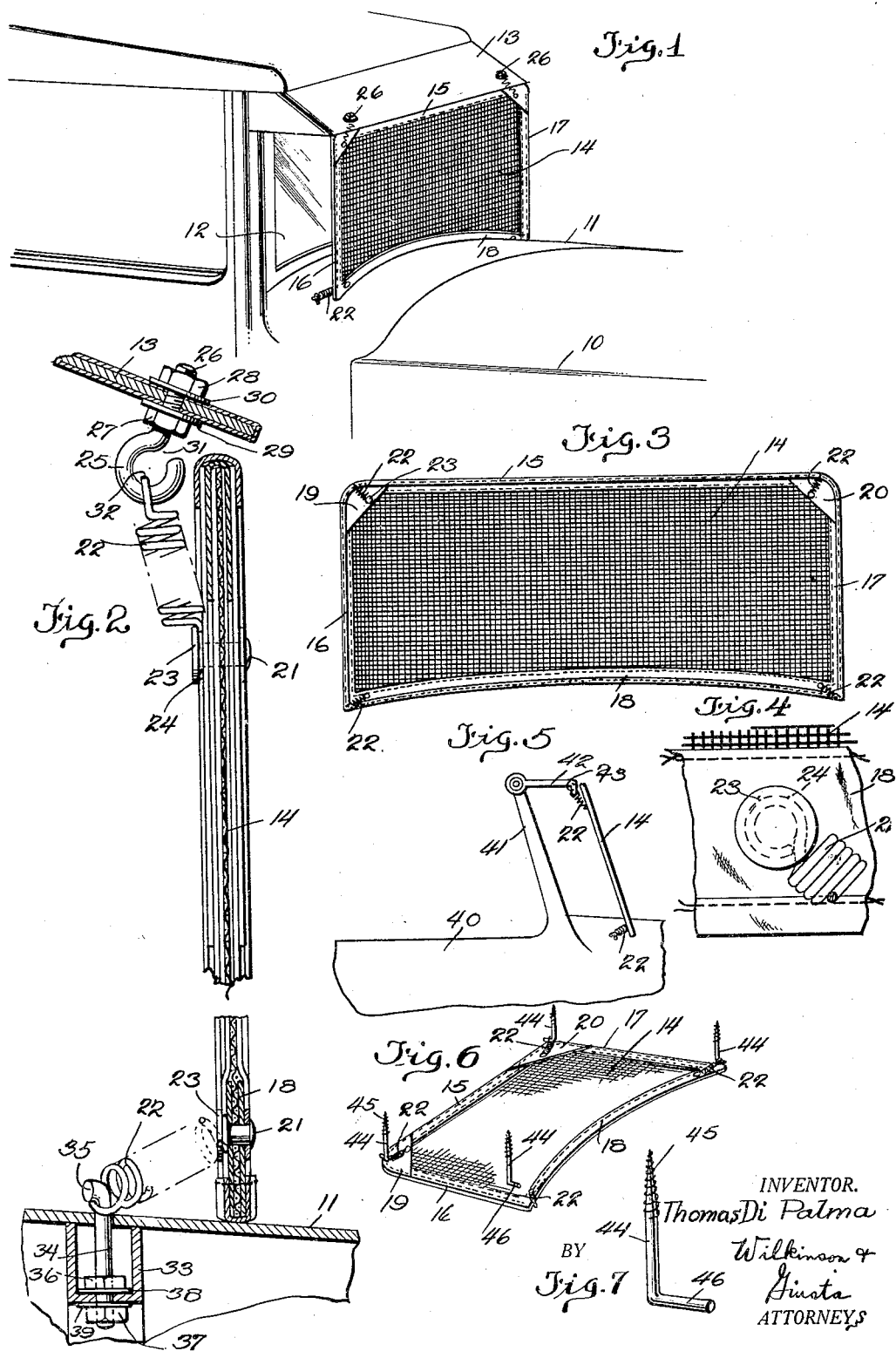
INVENTOR.
Thomas Di Palma
BY Wilkinson & Giusta
ATTORNEYS Patented Mar. 31, 1931

1,798,524

UNITED STATES PATENT OFFICE

THOMAS DI PALMA, OF NEW ORLEANS, LOUISIANA

WINDSHIELD

Application filed June 26, 1929. Serial No. 373,800.

The present invention relates to improvements in windshield protectors, and has for an object to provide a screen or mesh cloth in front of a full vision windshield of an automobile for the purpose of shielding the windshield from rain drops, sleet and snow which freeze upon the same and make vision impracticable, and also protecting the windshield glass from pebbles or other small flying objects and also from insects.

Another object of the invention is to provide an improved windshield protector in which the same may form an accessory to the usual standard automobile construction without necessitating any alteration or rearrangement of conventional parts.

A further object of the invention lies in providing a simple and effective means, whereby the windshield protector may be mounted in place and which will permit of the removal of same readily and quickly.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a fragmentary perspective view of an automobile showing the improved windshield protector mounted thereon.

Figure 2 is a vertical section taken through the sun visor and cowl portions of an automobile and through the improved windshield protector and its fastenings.

Figure 3 is a plan view of the improved protector.

Figure 4 is an enlarged fragmentary plan view showing a corner portion of the protector and fastening device.

Figure 5 is a fragmentary side view showing a modification.

Figure 6 is a perspective view of the improved windshield protector showing a further modification of fastening device, and Figure 7 is a perspective view on an enlarged scale of the fastening device shown in Figure 6.

Referring more particularly to the drawings 10 designates the hood, 11 the cowl, 12 the glass windshield, and 13 the sun visor of an automobile. These parts are of conventional construction and are found on virtually all self-propelled vehicles at the present time.

According to the invention a screen or mesh cloth 14 is mounted by any appropriate fastening means in advance of the windshield glass 12, preferably about five inches in front of the windshield glass.

In the present illustration the sun visor 13 and the cowl 11 are availed of in which to place the fastenings for securing the protector. The screen 14 is preferably of copper mesh wire and it is bounded or edged with rubberized cloth or any other material. The upper edge binding is indicated at 15 and it preferably extends in a substantially straight horizontal line in order to agree with the contour of the sun visor 13 beneath which it is adapted to fit. The side binding strips are indicated at 16 and 17 and such strips preferably extend down in substantially vertical lines. The lower binding strip 18 is curved as indicated in order to take the curvature of the cowl 11 against which it is adapted to come into contact.

Reinforcing triangular pieces 19 and 20 may be placed in the upper corner portions of the protector and these reinforcing pieces are adapted to receive the rivets or other fastenings 21 by which the coil springs 22 are rigidly held in place. The rivets 21 are preferably four in number and they are placed at the four corner portions of the protector, the rivets preferably passing through both the edge bindings and the screen material in order to thoroughly anchor the rivets in place and avoid any possibility of the same being pulled out. The rivets are upset in the usual manner upon the forward surface of the windshield protector, but these rivets are modified as to their rear heads 23 in that inner heads of very large diameter are provided being adapted to receive thereneath an elongated coiled terminal end part 24 of each spring 22.

As shown in Figure 4 the rivet head 23 is very large and it has a very wide surface contact with an elongated terminal portion 24 of the spring. The large rivet head 23 is upset or mashed down with great force upon this elongated terminal spring part 24 for the purpose of anchoring such spring end and preventing the spring end from having any lateral play or pivotal movement about the rivet as an axis.

In other words the coil spring 22 and its end 24 are held rigidly by the rivet to the protector so that the axes of the various coil springs 22 project out diagonally from the corner portions of the protector, as shown in Figure 4. The coil springs 22 consequently have a normal expansion and contraction in diagonal lines and the fastenings on the sun visor and cowl are situated favorably to take advantage of this diagonal spring movement.

Preferably hooks 25 are secured to the visor 13, the threaded shanks 26 of the hooks extending through the visor and having nuts 27 and 28 threaded on the shanks below and above the visor and rubber or other washers 29 and 30 are preferably interposed between the nuts 27 and 28 and the adjacent visor parts. The hooks 25 are placed at opposite end portions of the visor 13 in such relation that the open mouths 31 of the hooks will be situated forwardly and the hooks will be given an inclination due to the inclination of the visor 13, so that the opposite terminal looped end 32 of the coil springs 22 may be with facility slipped into the open mouths 31 and engaged with the hooks 25; but the relative construction is such that the diagonal force of the springs 22 will prevent the loops 32 from accidentally escaping through the open mouths 31 incident to jars and vibration of the vehicle.

The cowl 11, as shown in Figure 2, contains beneath a channel beam 33 to which the lower fastenings may be applied; or the lower fastenings may be simply attached to the sheet metal of the cowl. These fastenings may comprise shanks 34 having upper ends which are turned rearwardly as indicated at 35 and are adapted to receive the looped ends of the coil springs. The shanks 34 are threaded and provided with the lock nuts 36 and 37 and the washers 38 and 39 for securing the same in place.

In accordance with Figure 5, a vehicle is indicated at 40 and its windshield frame at 41. The improved protector is indicated at 14 and its coiled attaching springs at 22. In this case there is no sun visor but a bracket 42 is shown as extending out from the windshield frame 41 and having a hook 43 to receive the looped ends of the upper coil springs 22. The lower coil springs may be attached to the cowl as heretofore explained.

Referring more particularly to Figures 6 and 7, the windshield protector is constructed as before stated but in this instance I show fastening means including shanks 44 having conical screw threaded ends 45 and angular arms 46. These fastenings may be threaded into vehicle parts wherever required and the arms 46 will receive the looped ends of the coil springs.

It will be appreciated that the improved protector may be quickly placed and removed, and that when in place it will protect the windshield and the occupants of the vehicle.

The L-shaped screws as shown in Figure 7 may be placed in the upper front compartment over the driver's head for holding the windshield protector when not in use. The windshield protector will be made to fit all types of vehicles.

It is obvious that various changes and modifications may be made in the details of construction and design of the above specifically described embodiment of this invention without departing from the spirit thereof, such changes and modifications being restricted only by the scope of the following claim.

What is claimed is:—

In combination with a motor vehicle having a windshield, a curved cowl in front of the windshield and a visor above the cowl, a wind protecting screen extending in spaced relation in front of the windshield, bindings for the edges of the screen, the lower edge of the screen and its bindings being curved to conform to the curvature of the cowl and resting thereon approximately beneath the forward edge of the visor, rivets passing through the screen and its binding at the corner portions thereof and having large heads toward the windshield, upper and lower coil springs having terminal ends engaged non-rotatably by the rivet heads for holding said springs in oblique positions with respect to the screen, hooks carried by the cowl for removably engaging the outer free ends of the lower coil springs, and hooks carried by the visor and extending downwardly therefrom just inwardly of the forward edge of the visor and having open mouths disposed upwardly and forwardly for receiving the free end portions of the upper coil springs.

THOMAS DI PALMA.